DELTA MODULATION WITH DISCRETE COMPANDING

Filed Oct. 12, 1967 2 Sheets-Sheet 1

INVENTOR
S. J. BROLIN
BY R. B. Ardis
ATTORNEY

FIG. 4
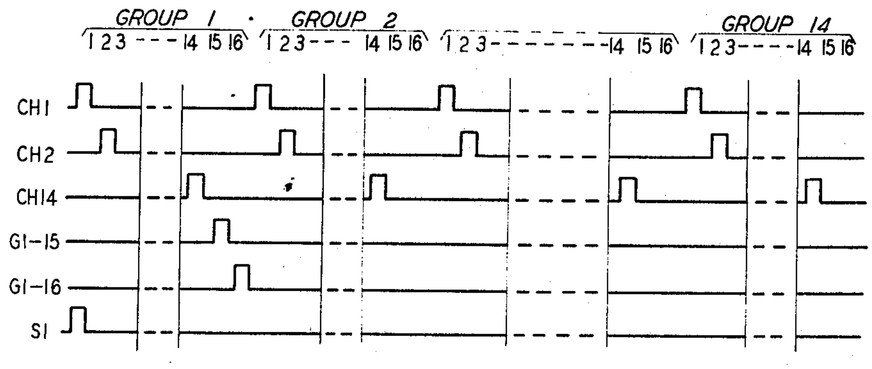
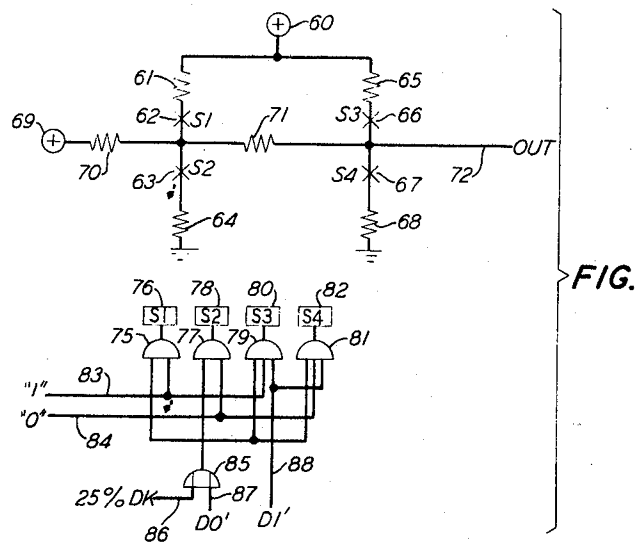
FIG. 5
FIG. 6
| STEP SIZE | DB DOWN | DUTY CYCLE | BINARY CODE | |
|---|---|---|---|---|
| | | | DI' | DO' |
| 1 | 0 | 100 % | 1 | 1 |
| 1/4 | 12 | 25 % | 1 | 0 |
| 1/16 | 24 | 100 % | 0 | 1 |
| 1/64 | 36 | 25 % | 0 | 0 |

United States Patent Office 3,500,441
Patented Mar. 10, 1970

3,500,441

DELTA MODULATION WITH DISCRETE COMPANDING

Stephen J. Brolin, Bronx, N.Y., assignor to Bell Telephone Laboratories, Incorporated, Murray Hill, N.J., a corporation of New York Filed Oct. 12, 1967, Ser. No. 674,943
Int. Cl. H03k *13/22;* H04j *3/00*
U.S. Cl. 179—15 7 Claims

ABSTRACT OF THE DISCLOSURE

Discrete syllabic compression is provided in a delta modulator by encoding the derivative of the signal being encoded in a two-digit pulse code modulation encoder and selecting the step size of the delta modulator from four different logarithmically related levels under the control of the pulse code modulation encoder. The output of the pulse code modulation encoder is transmitted to the distant delta demodulator in time division multiplex with the encoded signal to control the step size there and provide complementary expansion.

BACKGROUND OF THE INVENTION

This invention relates generally to digital message transmission systems and, more particularly, to digital message transmission systems which employ the type of differential pulse code modulation known as delta modulation.

In a system employing the most common form of delta modulation, the message waveform to be transmitted is sampled at a predetermined rate and positive and negative step signals are applied to integrating circuits at both transmitter and receiver at the sampling rate. In the delta modulator at the transmitter, the output of the integrator is compared with the instantaneous amplitude of the message waveform and the result of the comparison used to determine the polarity of the next step signal. The next step signal is positive, causing the integrator output to rise, if the integrator output is smaller than the message waveform and is negative, permitting the integrator output to fall, if the integrator output is larger than the message waveform. A binary digit of one kind is transmitted to the receiver each time the step signal is positive in the delta modulator, and one of the opposite kind is transmitted each time the step signal is negative. In the delta demodulator at the receiver, the incoming digits control the polarity of the locally generated step signals and the original message waveform is reproduced by the integrator and a low-pass filter.

Important factors tending to detract from transmission quality in a delta modulation system include quantizing noise and overload distortion. Quantizing noise is caused by step signals which are not and cannot be infinitesimally small and can be particularly bothersome under idle circuit conditions and when the amplitude of the transmitted message waveform is small. Overload distortion occurs when the step signal is not large enough to permit the integrator output to follow rapid changes in the instantaneous amplitude of the message waveform and can be a major annoyance whenever it occurs. Although it would be possible to reduce quantizing noise by reducing the size of the step signal, overload distortion would then be increased. Similarly, although overload distortion could be reduced by increasing the size of the step signal, such a change would increase quantizing noise.

The dilemma can be resolved by the introduction of an appropriate form of companding into the delta modulation system. In this manner, the dynamic range of the message waveform is effectively reduced by compression at the transmitter and restored by complementary expansion at the receiver. With its dynamic range reduced, the message waveform is less subject to either quantizing noise or overload distortion. In the past, companding has normally been accomplished with the aid of variolosser networks which include nonlinear devices such as semiconductor diodes. Devices of this type tend to be rather expensive, however, and need to be carefully selected and matched if the desired amount of compression is to be secured and if the expansion at the receiver is to complement the compression at the transmitter with the necessary degree of accuracy.

The present inventor's prior application Ser. No. 572,823, filed Aug. 16, 1966, now U.S. Patent No. 3,461,244, discloses an arrangement which provides syllabic companding in a delta modulation system and reduces both quantizing noise and overload distortion by changing the dynamic range of the delta modulator and delta demodulator themselves rather than the dynamic range of the message waveform. In that arrangement, the size of the step signal in the delta modulator is adapted to both the volume level and the frequency content of the message waveform over at least part of its dynamic range on a continuously varying basis. The message waveform is supplied to a differentiator, rectifier, and low-pass filter at the transmitter and the output used to drive an auxiliary delta modulator which controls the size of the step signal in the main or audio delta modulator. The output of the auxiliary delta modulator is, in addition, transmitted in digital form to the receiver for controlling the size of the step signal on a continuously varying basis in the main or audio delta demodulator. While successful in reducing quantizing noise and overload distortion, such an arrangement has a tendency to introduce another form of distortion, known as companding distortion, because it is difficult to make the size of the step signals in the transmitter and receiver track one another with a high degree of precision over their entire range when adjusted on a continuously varying basis.

A principal object of the present invention is, therefore, to minimize companding distortion caused by the failure of the step signals to track one another accurately in size in the transmitter and receiver of a delta modulation system.

Another and more particular object of the invention is to minimize companding distortion in a delta modulation system in as simple and inexpensive a manner as possible.

SUMMARY OF THE INVENTION

The present invention minimizes companding distortion in a delta modulation system by employing a limited number of discrete sizes for the step signals in both transmitter and receiver. Since there are only a relatively small number of different sized step signals to be generated, they can be generated with a very high degree of precision and the step sizes in the transmitter and receiver may easily be made to track one another accurately in size over their entire range.

More specifically, in accordance with a feature of the invention, discrete syllabic compression is provided in a delta modulator by encoding the slope of the message waveform in an $n$-digit pulse code modulation encoder, where $n$ is an integer greater than unity, and generating the delta modulation step signal at one of $n^2$ digerent discrete logarithmically related levels under the control of the pulse code modulation encoder. In accordance with another feature of the invention, the output of the pulse code modulation encoder is also transmitted to the distant delta demodulator in time-division multiplex with the encoded message waveform to generate the same sized step signal there and provide complementary expansion.

BRIEF DESCRIPTION OF THE DRAWINGS

FIG. 4 illustrates the relative timing of message waveform and companding digits in a subscriber carrier system illustrated in FIG. 1.

FIG. 5 illustrates a four-step discrete step signal generator suitable for use in the delta modulator and demodulator shown in FIGS. 2 and 3.

FIG. 6 is a table illustrating the manner in which the step signal generator shown in FIG. 5 is controlled by a two-digit binary code.

DETAILED DESCRIPTION

Figure 1:
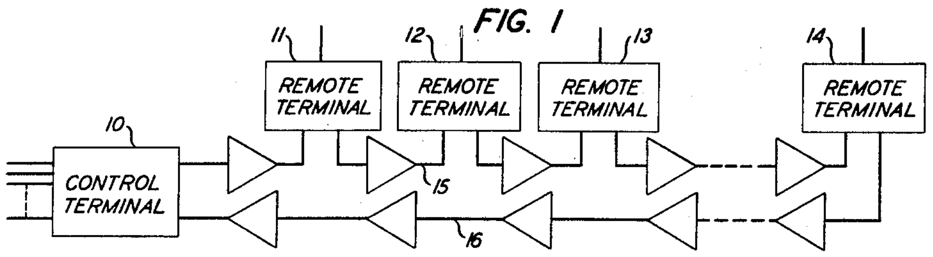
FIG. 1 is a block diagram of a complete multichannel subscriber carrier system embodying the several features of the invention.

The subscriber carrier system illustrated in block diagram form in FIG. 1 includes an office or control terminal 10, a plurality of remote terminals of which terminal 11 through 14 are shown, an outward repeatered line 15, and an inward repeatered line 16. Control terminal 10 is located at a telephone central office and contains delta modulation transmitting and receiving terminal equipment for as many as fourteen telephone message channels. With the aid of concentration, these fourteen channels can provide private line telephone service for as many as eighty subscribers. The fourteen message channels are combined in time division multiplex for transmission to their respective remote terminals. The remote terminals are, in turn, spaced at intervals along outward line 15 and each contains delta modulation transmitting and receiving terminal equipment for one or more telephone message channels. At each remote terminal, delta modulation receiving equipment intercepts the channel or channels with which it is associated and delta modulation transmitting equipment reinserts it in appropriate digit spaces on outward line 15. All 14 message channels return to control terminal 10 in time division multiplex on inward line 16. Each remote terminal may serve a single message channel or, alternatively and even more likely, different remote terminals may serve different numbers of channels. With concentration, each remote terminal always serves the same subscribers but is not always associated with the same time division channels. Rather, different channels may be associated with different terminals under different conditions of operation. The repeaters on both outward line 15 and inward line 16 are regenerative pulse repeaters which operate, for example, at a bit rate of 1.544 mHz.

At control terminal 10 in FIG. 1 and at each remote terminal, suitable hybrid networks separate the two opposite directions of transmission in the respective message channels. For each channel, a delta modulator converts the incoming message waveform into binary digits for transmission out over the line and a delta demodulator converts received binary digits back into the original message waveform.

Figure 2:
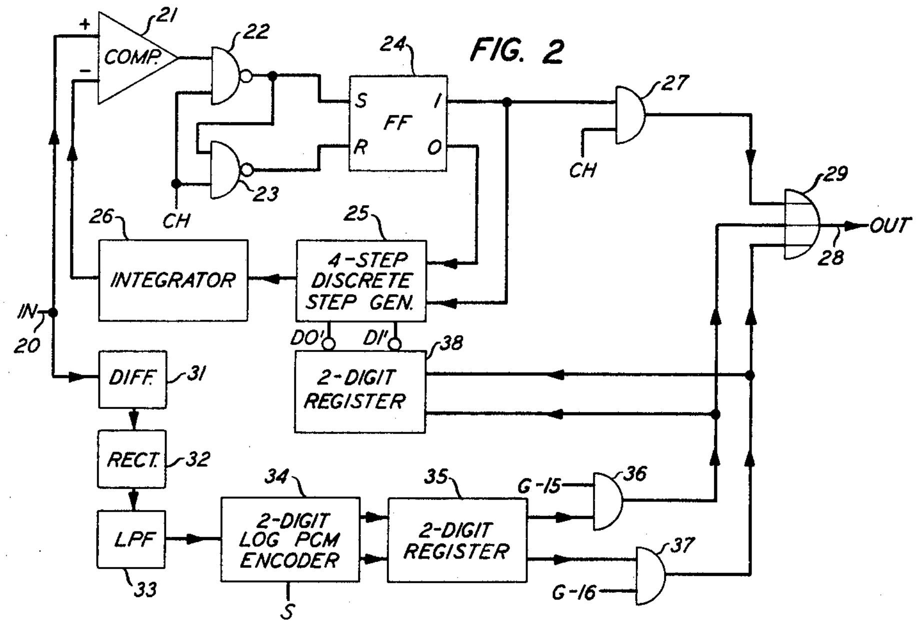
FIG. 2 is a block diagram of a delta modulator embodying features of the invention and suitable for use in the subscriber carrier system illustrated in FIG. 1.

The delta modulator illustrated in FIG. 2 serves both to encode the incoming message waveform and to provide discrete syllabic compression in accordance with the present invention. As shown, an input line 20 is connected to one input of a comparator 21, which is a two-input circuit delivering an output having the polarity of the difference between its inputs. The output of comparator 21 is connected to a sample-and-hold circuit made up of a pair of inverting AND gates 22 and 23 and a bistable multivibrator or flip-flop 24. The inverting property of AND gates 22 and 23 is indicated symbolically by the small circles at their respective outputs.

As illustrated in FIG. 2, the output of comparator 21 is connected to one input of AND gate 22 and the output of AND gate 22 is connected to one input of AND gate 23. Channel pulses, which occur at the channel sampling rate of 96.5 kHz., are applied to the other inputs of AND gates 22 and 23. Finally, the output of AND gate 22 is connected to the set input S of flip-flop 24, while the output of AND gate 23 is connected to the reset input R.

When the output of comparator 21 in FIG. 2 is positive while a channel pulse is present, AND gate 22 applies a negative voltage to the set input of flip-flop 24 and AND gate 23 applies a positive voltage to the reset input. Under such conditions, the output state of flip-flop 24 is as illustrated, with binary "1" appearing at the upper or set output and binary "0" appearing at the lower or reset output. When the output of comparator 21 is negative during a channel pulse, AND gate 22 applies a positive voltage to the set input of flip-flop 24 and AND gate 23 applies a negative voltage to the reset input. Under such conditions, the output state of flip-flop 24 is opposite to that illustrated, with binary "0" appearing at the upper or set output and binary "1" appearing at the lower or reset output. By way of example, in both states of flip-flop 24, binary "1" is represented by a positive voltage and binary "0" by zero voltage.

In accordance with a feature of the invention, the outputs of flip-flop 24 in FIG. 2 are connected to respective inputs of a four-step discrete step signal generator 25, which generates a positive-going step signal when flip-flop 24 is in the state illustrated and a negative-going step signal when flip-flop 24 is in the opposite state. The output of step signal generator 25 is connected to an integrating circuit 26 and the output of integrator 26 is connected to the remaining input of comparator 21. Integrator 26 may include one or more stages of integration, as desired.

Output digits in FIG. 2 are taken from the upper or set output of flip-flop 24 and applied to one input of an AND gate 27, the other input of which is supplied with channel pulses at the 96.5 kHz. sampling rate delayed slightly from those applied to AND gates 22 and 23. The output from AND gate 27 is supplied to the outgoing line 28 through an OR gate 29.

Except for four-step discrete step generator 25, the portion of the apparatus illustrated in FIG. 2 which has thus far been described is a conventional delta modulator. The sample-and-hold circuit samples the output of comparator 21 at a rate sufficiently high to permit the audio message waveform to be reproduced with acceptable accuracy. If the output of comparator 21 is positive, indicating that the instantaneous amplitude of the message waveform on input line 20 is larger than the output of integrator 26, a positive step signal is provided by generator 25 and binary "1" is transmitted through AND gate 27 and OR gate 29. If the output of comparator 21 is negative, indicating that the instantaneous amplitude of the message waveform on input line 20 is smaller than the output of integrator 26, the step signal produced by genera'or 25 is negative and binary "0" is transmitted through AND gate 27 and OR gate 29.

In accordance with a feature of the invention, the dynamic range of the delta modulator itself is enhanced by adapting the size of the positive-going and negative-going step signals produced by generator 25 to the volume level and the frequency content of the message waveform on a discrete basis. Since a delta modulator overloads on slope, a level sensor made up of a differentiator 31, a rectifier 32, and a low-pass filter 33 in tandem is connected from input line 20 to the input of a two-digit pulse code modulation encoder 34. Encoder 34 is a pulse code modulation encoder of a type well known in the art and samples the output of low-pass filter 33 at a 1500 Hz. rate, once during every fourth cycle of 16 consecutive groups, producing a two-digit parallel binary code output on its two output leads.

As a two-digit encoder, encoder 34 encodes up to four different levels. These are preferably logarithmically related to one another, 12 decibels apart. The most significant digit of the binary code output of pulse code modulation encoder 34 appears on the upper of the two output leads and the least significant digit appears on the lower. The encoder is supplied with timing pulses at the 1500 Hz. rate to control its operation. By way of illustration, these pulses occur at 1/64 the rate of the channel pulses or, in other words, once during every fourth cycle of 16 consecutive groups and each begins at substantially the same time as the first of a group of 16 channel pulses.

The output from pulse code modulation encoder 34 in FIG. 2 is gated into a two-digit register 35 and stored there until the next cycle, when it is read out. On the output side of register 35, the most significant digit from encoder 34 appears on the upper lead and is supplied to one input of an AND gate 36, while the least significant digit appears on the lower lead and is supplied to one input of an AND gate 37. The other inputs of AND gates 36 and 37 are supplied with timing pulses which occur at the 1500 Hz. rate during the 15th and 16th digit spaces, respectively, of the appropriate group of 16 channel pulses. The outputs of AND gates 36 and 37 are thus confined to the 15th and 16th digit spaces, respectively, and are supplied to outgoing line 28 in time division multiplex with the delta modulation digits from AND gate 27 through OR gate 29.

To control the operation of step signal generator 25 in the embodiment of the invention illustrated in FIG. 2, the outputs of AND gates 36 and 37 are also connected to the input leads of a second two-digit register 38. Register 38 is much the same as register 35 but, as indicated by the small circles, its outputs are inverted. Each stored binary "0" is thus delivered as binary "1" and each stored binary "1" is delivered as binary "0." The output leads from register 38 are marked D0′ and D1′ to denote the inverted character of the least and most significant digits delivered and the digits carried by them are supplied directly as control signals to step generator 25 which, in accordance with a feature of the invention, produces one of four different discrete step signal levels. These levels, which are controlled by the two-digit binary code group originally generated by pulse code modulation encoder 34, are preferably logarithmically related to one another, 12 decibels apart, and may be either positive-going or negative-going from a predetermined positive voltage level, depending upon the state of flip-flop 24. The step signal used in the delta modulation process is thus made to increase in magnitude by discrete steps as the slope of the message waveform increases and to decrease in magnitude by discrete steps as the slope of the message waveform decreases.

Figure 3:
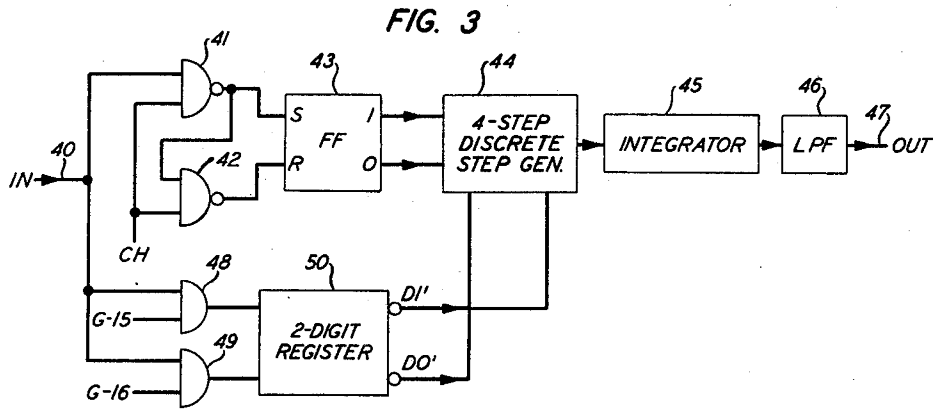
FIG. 3 is a block diagram of a delta demodulator embodying features of the invention and suitable for use in the subscriber carrier system shown in FIG. 1.

The delta demodulator illustrated in FIG. 3 serves not only to decode the received message digits and convert them back to the original message waveform but also to provide discrete syllabic expansion which is complementary to the compression performed at the transmitting terminal in the associated delta modulator. As shown, an input line 40 is connected to a sample-and-hold circuit made up of a pair of inverting AND gates 41 and 42 and a flip-flop 43. Input line 40 is connected to one input of AND gate 41 and the output of AND gate 41 is connected to one input of AND gate 42. The remaining inputs of AND gates 41 and 42 are supplied with channel pulses at the 96.5 kHz. channel sampling rate. The output of AND gate 41 is also connected to the set input S of flip-flop 43, and the output of AND gate 42 is connected to the reset input R.

The set and reset outputs of flip-flop 43 in FIG. 3 are connected to respective inputs of a four-step discrete step signal generator 44, which is substantially identical to step signal generator 25 in FIG. 2. Step signal generator 44 produces a positive-going step signal when flip-flop 43 is in the state illustrated and a negative-going step signal when flip-flop 43 is in the opposite state. The output of step signal generator 44 is connected to an integrator 45, the output of which is connected through a low-pass filter 46 to recreate the originally encoded message waveform. Integrator 45 is substantially identical to integrator 26 in FIG. 2 and, like it, may include one or more stages of integration as desired.

In operation, the incoming binary message digits received on input line 40 cause the sample-and-hold circuit, step signal generator 44, and integrator 45 in FIG. 3 to track the action of the sample-and-hold circuit, step signal generator 25, and integrator 26 in FIG. 2. A received binary "1" causes a negative voltage to appear at the output of AND gate 41 and a positive voltage to appear at the output of AND gate 42. Flip-flop 43 is switched to the state illustrated and a step signal generator 44 produces a positive-going step signal. A received binary "0" causes a positive voltage to appear at the output of AND gate 41 and a negative voltage to appear at the output of AND gate 42. Flip-flop 44 is switched to the state opposite that illustrated, and step signal generator 44 produces a negative-going step signal.

In accordance with a feature of the invention, the audio delta demodulator in FIG. 3 is provided with discrete syllabic expansion complementary to the discrete syllabic compression provided the audio delta modulator in FIG. 2 by a pair of AND gates 48 and 49 and a two-digit register 50. The input line 40 is connected to one input each of AND gates 48 and 49, which serve to select the incoming companding digits with the aid of timing pulses applied at 1500 Hz. rate during the 15th and 16th digit spaces, respectively, of the appropriate group of digit spaces. Register 50 is substantially the same as register 38 in FIG. 2 and, like it, inverts the digits appearing on its two output leads D0′ and D1′. These inverted companding digits are, in turn, applied as control signals to step signal generator 44, causing the latter to track the operation of step signal generator 25 in FIG. 2.

FIG. 4 is a timing diagram illustrating the sequence of channel sampling and companding control pulses used in the embodiment of the invention illustrated in FIG. 1 and applied specifically to the delta modulator and demodulator shown in FIGS. 2 and 3. In each group of 16 consecutive digit spaces, a channel pulse is provided for channel 1 during the first digit space, a channel pulse is provided for channel 2 during the second digit space, and so on through the 14th digit space. The 15th and 16th digit spaces in each group, in one out of each four cycles of 16 consecutive groups, are used for companding, in accordance with a feature of the invention, and during successive groups in that cycle companding control pulses are provided for each channel in sequence. The 15th and 16th digit spaces in each group in the remaining cycles are used for purposes not pertinent to the invention. As the 14 message channels and their respective companding digits are combined in time division multiplex for transmission, each group of 16 consecutive digits includes a digit for each of the 14 channels and, in every fourth cycle of 16 consecutive groups, two companding digits for one channel only. The companding digits for the next channel are found in the next group of digits in the same cycle. For a basic bit rate of 1,544 mHz. and a channel digit rate of 96.5 kHz., the present invention thus permits the application of discrete syllabic companding to all channels by transmitting a pair of companding digits at a rate as low as 1500 Hz. In FIG. 4, the lines labeled CH1, CH2, and CH14 illustrate channel sampling pulses for channels 1, 2, and 14, the lines labeled G1–15 and G1–16 illustrate timing pulses for the companding control digits of channel 1, and the line labeled S1 illustrates the pulse controlling the operation of pulse code modulation encoder 34 in FIG. 2 for channel 1. The output from encoder 34 is, as has already been stated, read into register 35 at the beginning of the next succeeding cycle.

A four-step discrete step signal generator suitable for use as step generators 25 and 44 in FIGS. 2 and 3 is illustrated in FIG. 5. Although for simplicity the circuit is shown with relays providing the necessary switching action, it is to be understood, of course, that equivalent electronic switching circuits of types well known in the art are more likely to be employed in practice. As shown in FIG. 2, a voltage source 60 is connected through a resistor 61, the make contact 62 of a relay S1, the make contact 63 of a relay S2, and a resistor 64 to ground and through a resistor 65, the make contact 66 of a relay S3, the make contact 67 of a relay S4, and a resistor 68 to ground. In addition, a second voltage source 69 is connected through a resistor 70 to the junction between contacts 62 and 63, a resistor 71 is connected from that junction to the junction between contacts 66 and 67, and an output lead 72 is connected to the last-mentioned junction. Output lead 72 is equivalent to the output lead to inegrator 26 in FIG. 2 and to the output lead to integrator 45 in FIG. 3. The voltage from source 60 is of the same polarity as that from source 69 and twice its value. Resistors 61, 64, 65, and 68 have equal resistances which are large with respect to those of resistors 70 and 71, and resistor 71 has substantially fourteen times the resistance of resistor 70.

When either of make contacts 62 and 63 in FIG. 5 is closed, a current is injected into the junction between resistors 70 and 71 which divides in inverse relation to the resistance values. One fifteenth of the total current flows to output lead 72. When the corresponding one of make contacts 66 and 67 is closed in addition, the same current is injected directly into output lead 72, giving a total current sixteen times as great as that flowing to output lead 72 wih only make contact 62 or 63 closed.

The control portion of the four-step discrete step signal generator in FIG. 5 includes an AND gate 75 driving the operating coil 76 of relay S1, an AND gate 77 driving the operating coil 78 of relay S2, an AND gate 79 driving the operating coil 80 of relay S3, and an AND gate 81 driving the operating coil 82 of relay S4. A polarity control lead 83, corresponding to the upper or "1" inputs from flip-flops 24 and 43, is connected to inputs of AND gates 75 and 79, and a polarity control lead 84, corresponding to the lower or "0" inputs from flip-flops 24 and 43, is connected to the inputs of AND gates 77 and 81. To control step size, an OR gate 85 has its output connected to inputs of all four AND gates 75, 77, 79, and 81, and a 25 percent duty cycle input lead 86 is connected to one input of OR gate 85, a least significant digit input lead 87 is connected to the other input of OR gate 85, and a most significant digit input lead 88 is connected to inputs of AND gates 79 and 81. Input leads 87 and 88 correspond to the leads from the D0′ and D1′ outputs, respectively of registers 38 and 50 in FIGS. 2 and 3 and carry voltage levels which persist for four cycles of sixteen groups of sixteen consecutive digit spaces. Input lead 86, on the other hand, carries a so-called 25 percent duty cycle input in the form of continuous repetitive pulses which persist for only four digit spaces of a full group of sixteen consecutive digit spaces.

The operation of the four-step discrete step signal generator illustrated in FIG. 5 is best described with the aid of the table shown in FIG. 6. In FIG. 6, the first column at the left indicates output step signal magnitudes, the second indicates the corresponding step signal magnitudes in decibels, the middle column indicates the duty cycles of the step signals generated, and the two columns on the right indicate corresponding inverted binary code control digits applied to input leads 87 and 88. The step signals indicated are positive-going when binary "1" is applied to polarity control lead 83 and negative-going when binary "1" is applied to polarity control lead 84.

The step size supplied from output lead 72 to an integrator is obtained by multiplying a current by a pulse width. Physically, this corresponds to the amount of charge deposited on or removed from a capacitor. The step size is varied by changing either the magnitude of the current, the pulse width, or both. In the arrangement shown in FIG. 5, four step sizes are achieved by using two discrete values of current and two discrete pulse widths. For simplicity, the following description of the manner in which the step size is changed deals only with positive-going step signals, for which control is achieved through relays S1 and S3. The operation is the same for a negative-going step signal, except that control is achieved through relays S2 and S4.

The largest step signal is generated at output lead 72 in FIG. 5 when binary "1" is applied to both input leads 87 and 88. The binary "1" on input lead 87 overrides the 25 percent duty cycle pulse on input lead 86 and OR gate 85 supplies an output to all AND gates for the entire duration of the group of sixteen digit spaces, i.e., on a 100 percent duty cycle basis. This output activates AND gate 75 and operates relay S1 and, together with binary "1" on input lead 88, activates AND gate 79 and operates relay S3. Since make contacts 62 and 66 are both closed for the full duration of the group, maximum current is delivered to the integrator through output lead 72.

When binary "1" is applied to input lead 88 and binary "0" is applied to input lead 87, OR gate 85 supplies only the 25 percent duty cycle output and relays S1 and S3 are operated only for 25 percent of the duration of the group. The maximum current is thus delivered to the integrator through output lead 72 only for 25 percent of the time period and the resulting step is down 12 decibels from its maximum value.

When binary "1" is applied to input lead 87 only, in the step signal generator illustrated in FIG. 5, OR gate 85 supplies what is, in effect, a 100 percent duty cycle output once again. Only relay S1 is operated, closing make contact 62, and the current delivered through output lead 72 is one sixteenth of the value it assumes when both relays S1 and S3 are operated. A sixteenth of the maximum current is thus delivered for 100 percent of the time period and the resulting step is down 24 decibels from its maximum value.

The final and lowest step is generated when binary "1" is applied to neither of input leads 87 and 88. OR gate 85 then supplies only the 25 percent duty cycle output and relay S1 alone is operated for 25 percent of the duration of the group. A sixteenth of the maximum current is delivered for only 25 percent of the time period and the resulting step is down 36 decibels from its maximum value It is to be understood that the above-described arrangement is illustrative of the application of the principles of the invention. Numerous other embodiments may be devised without departing from the spirit and scope of the invention.

What is claimed is:

1. A delta modulation system with discrete syllabic companding for transmission of a message waveform from a transmitting terminal to a receiving terminal which includes, at said transmitting terminal, a delta modulator comprising a comparator having a single output and a pair of inputs, means to sample the output of said comparator on a periodic repetitive basis, an output transmitter and a first step generator both connected to respond to the sampled output of said comparator, said output transmitter producing a binary digit of one kind for transmission to said receiving terminal whenever the sample is positive and a binary digit of another kind for transmission to said receiving terminal whenever the sample is negative and said first step generator producing a step signal of one polarity whenever the sample is positive and a step signal of the opposite polarity whenever the sample is negative, said first step generator having $n^2$ different discrete output step signal magnitudes, where $n$ is an integer greater than unity, a first integrator connected to receive the step signal produced by said first step generator, means to supply the message waveform to be transmitted and the output from said first integrator to the respective inputs of said comparator, means to detect the slope of the message waveform, an $n$-digit pulse code modulation encoder connected to encode the detected slope in terms of $n$ binary digits, means to store the output of said encoder, means to supply said stored binary digit encoder output to said transmitter for transmission to said receiver and means to vary the output step signal magnitude of said first step generator under the control of the stored output of said encoder and, at said receiving terminal, a delta demodulator comprising a second step generator connected to respond to binary digits received from said output transmitter, said second step generator producing a step signal of one polarity whenever the received binary digit is of one kind and a step signal of the opposite polarity whenever the received binary digit is of the other kind and having the same number of different discrete output signal magnitudes as said first step generator, a second integrator connected to receive the step signal produced by said second step generator, and a low-pass filter connected to the output of said second integrator to recreate the message waveform supplied at said transmitting terminal, and means responsive to said received binary digits to vary the magnitude of the output step signal from said second step generator at said receiving terminal to match the variation of the magnitude of the output step signal from said first step generator at said transmitting terminal.

2. A delta modulation system in accordance with claim 1 in which said $n$-digit pulse code modulation encoder is logarithmic and in which the detected slope of the message waveform is encoded on a periodic repetitive basis at a rate at least several times smaller than the rate at which the output of said comparator is sampled.

3. A delta modulation system in accordance with claim 2 in which the binary digits produced at said transmitting terminal by said output transmitter and said pulse code modulation encoder are combined in time division multiplex for transmission to said receiving terminal over a common medium.

4. A delta modulation system in accordance with claim 3 which includes, at said receiving terminal means to store the binary digits received from said pulse code modulation encoder and means to vary the output step signal magnitude of said second step generator under the control of the stored binary digits received from said pulse code modulation encoder.

5. A delta modulator with discrete syllabic compression which comprises a comparator having a single output and a pair of inputs, means to sample the output of said comparator on a periodic repetitive basis, an output transmitter and a step generator both connected to respond to the sampled output of said comparator, said output transmitter producing a binary digit of one kind for transmission whenever the sample is positive and a binary digit of another kind for transmission whenever the sample is negative and said step generator producing a step signal of one polarity whenever the sample is positive and a step signal of the opposite polarity whenever the sample is negative, said step generator having $n^2$ different discrete output step signal magnitudes, where $n$ is an integer greater than unity, an integrator connected to receive the step signal produced by said step generator, means to supply the message waveform to be transmitted and the output of said integrator to the respective inputs of said comparator, means to detect the slope of the message waveform, an $n$-digit pulse code modulation encoder connected to encode the detected slope in terms of $n$ binary digits, means to store the output of said encoder, and means to vary the output step signal magnitude of said step generator under the control of the stored output of said encoder.

6. A delta modulator in accordance with claim 5 in which said $n$-digit pulse code modulation encoder is logarithmic and in which the detected slope of the message waveform is encoded on a periodic repetitive basis at a rate at least several times smaller than the rate at which the output of said comparator is sampled.

7. A delta modulator in accordance with claim 6 in which the binary digits produced by said output transmitter and the binary digits produced by said pulse code modulation encoder are combined in time division multiplex for transmission over a common medium.

References Cited

UNITED STATES PATENTS

| | | | |
|---|---|---|---|
| 2,724,740 | 11/1955 | Cutler | 325—38.1 |
| 2,816,267 | 12/1957 | De Jager et. al. | 325—38.1 |
| 2,897,275 | 7/1959 | Bowers | 325—39 |
| 3,393,364 | 7/1968 | Fine | 325—38.1 |

ROBERT L. GRIFFIN, Primary Examiner

J. A. BRODSKY, Assistant Examiner

U.S. Cl. X.R.

325—38, 141; 332—11; 333—14